United States Patent
Tabuchi et al.

(10) Patent No.: US 9,551,421 B2
(45) Date of Patent: *Jan. 24, 2017

(54) SLIDING MEMBER AND PROCESS FOR PRODUCING THE SAME

(75) Inventors: Yuhei Tabuchi, Kitaibaraki (JP); Yoshiyuki Abe, Kitaibaraki (JP); Toshiyuki Maeda, Kitaibaraki (JP)

(73) Assignee: NOK Corporation, Tokyo (JP)

( * ) Notice: Subject to any disclaimer, the term of this patent is extended or adjusted under 35 U.S.C. 154(b) by 541 days.

This patent is subject to a terminal disclaimer.

(21) Appl. No.: 13/148,339

(22) PCT Filed: Feb. 8, 2010

(86) PCT No.: PCT/JP2010/051774
§ 371 (c)(1),
(2), (4) Date: Aug. 8, 2011

(87) PCT Pub. No.: WO2010/092921
PCT Pub. Date: Aug. 19, 2010

(65) Prior Publication Data
US 2011/0305871 A1 Dec. 15, 2011

(30) Foreign Application Priority Data
Feb. 10, 2009 (JP) .................. 2009-028286

(51) Int. Cl.
*F16J 15/10* (2006.01)
*C08K 7/02* (2006.01)
*C08L 77/00* (2006.01)
*C08L 77/06* (2006.01)
*F16J 15/32* (2016.01)
*F16J 15/34* (2006.01)
*C08L 77/10* (2006.01)

(52) U.S. Cl.
CPC ............... *F16J 15/102* (2013.01); *C08K 7/02* (2013.01); *C08L 77/00* (2013.01); *C08L 77/06* (2013.01); *F16J 15/3284* (2013.01); *F16J 15/3496* (2013.01); *C08L 77/10* (2013.01); *C08L 2205/02* (2013.01); *Y10T 428/24355* (2015.01)

(58) Field of Classification Search
CPC ....................................... F16J 15/102
USPC ........................................ 264/400
See application file for complete search history.

*Primary Examiner* — Larry Thrower
(74) *Attorney, Agent, or Firm* — K. David Crockett, Esq.; Niky Economy Syrengelas, Esq.; Crockett & Crockett, PC

(57) ABSTRACT

Object: To provide a sliding member with a low friction coefficient in which, when fine dents are formed in a surface of the sliding member by dimpling using a laser, no hard raised portions are generated, and which does not damage a mating member; and to provide a process for producing the sliding member.

Solution Means: A sliding member comprising a polyamide resin and 10 to 50 wt % of a fibrous filler selected from the group consisting of carbon fibers, aramid fibers, and whiskers, and having fine dents formed in a sliding surface thereof by dimpling using a laser; and a process for producing a sliding member comprising adding 10 to 50 wt % of a fibrous filler selected from the group consisting of carbon fibers, aramid fibers, and whiskers to a polyamide resin, and forming fine dents in a sliding surface of the sliding member by dimpling using a laser.

1 Claim, 3 Drawing Sheets

SLIDING MEMBER AND PROCESS FOR PRODUCING THE SAME

FIELD OF THE INVENTIONS

The present invention relates to a sliding member such as seal rings, which require low friction coefficients; and more particularly to a sliding member with a low friction coefficient in which, when fine dents are formed in a surface of the sliding member by dimpling using a laser, no hard raised portions are generated, and which does not damage a mating member; and a process for producing the sliding member.

BACKGROUND OF THE INVENTIONS

Thermoplastic resins have recently been used as a sliding member for use in high-load parts because of their low specific gravity, wide range of options for the shapes of molded articles, and excellent moldability.

Polyamide resins have been widely used as a sliding member because of their high self-lubricating properties among thermoplastic resins. Glass fibers have been added to polyamide resins, in order to improve the mechanical strength and heat resistance (Patent Literatures 1 and 2).

With the recent growing concern for environmental issues, it is necessary, even in the area of a sliding member such as seal rings, to enhance energy efficiency, and, therefore, to improve sliding properties, e.g., to reduce the friction coefficient.

As a means for improving sliding properties, e.g., reducing the friction coefficient, the formation of fine dents in a sliding surface using a laser is known (Patent Literature 3).

However, in the case of a sliding member made of a glass fiber-reinforced polyamide resin, the glass fiber is melted by the laser heat during laser processing, causing melted spheres to be formed on the sliding surface. These melted spheres cause problems such as damage to a mating member or an increased friction coefficient.

CITATION LIST

Patent Literature

Patent Document 1: JP-A-H08-28572
Patent Document 2: JP-A-2007-224118
Patent Document 3: JP-A-2007-225105

SUMMARY

Technical Problem

Accordingly, an object of the present invention is to provide a sliding member with a low friction coefficient that, when fine dents are formed in a surface of the sliding member by dimpling using a laser, no hard raised portions are generated, and that does not damage a mating member.

Another object of the present invention is to provide a process for producing a sliding member with a low friction coefficient that, when fine dents are formed in a surface of the sliding member by dimpling using a laser, no hard raised portions are generated, and that does not damage a mating member.

Other objects of the present invention will become apparent from the following description.

Solution to Problem

The foregoing objects will be solved by the present inventions set forth below.

The invention is a sliding member comprising a polyamide resin and 10 to 50 wt % of a fibrous filler selected from the group consisting of carbon fibers, aramid fibers, and whiskers, and having fine dents formed in a sliding surface thereof by dimpling using a laser.

Another new member achieving these goals is a sliding member comprising a polyamide resin and 10 to 50 wt % of an inorganic filler selected from the group consisting of talc, clay, and calcium carbonate, and having fine dents formed in a sliding surface thereof by dimpling using a laser.

Another new member achieving these goals is the sliding member, defined in the preceding paragraphs wherein the fine dents have a maximum depth of 5 to 50 μm.

Another new invention achieving these goals is a process for producing a sliding member comprising adding 10 to 50 wt % of a fibrous filler selected from the group consisting of carbon fibers, aramid fibers, and whiskers to a polyamide resin, and forming fine dents in a sliding surface of the sliding member by dimpling using a laser.

Another new invention achieving these goals is a process for producing a sliding member comprising adding 10 to 50 wt % of an inorganic filler selected from the group consisting of talc, clay, and calcium carbonate to a polyamide resin, and forming fine dents in a sliding surface of the sliding member by dimpling using a laser.

Another new invention achieving these goals is the process, defined in the preceeding paragraphs wherein the fine dents have a maximum depth of 5 to 50 μm.

Advantageous Effects of Invention

In accordance with the present invention, there is provided a sliding member with a low friction coefficient that, when fine dents are formed in a surface of the sliding member by dimpling using a laser, no hard raised portions are generated, and that does not damage a mating member.

In accordance with the present invention, there is also provided a process for producing a sliding member with a low friction coefficient that, when fine dents are formed in a surface of the sliding member by dimpling using a laser, no hard raised portions are generated, and that does not damage a mating member.

DETAILED DESCRIPTION OF THE INVENTIONS

Figure 1:
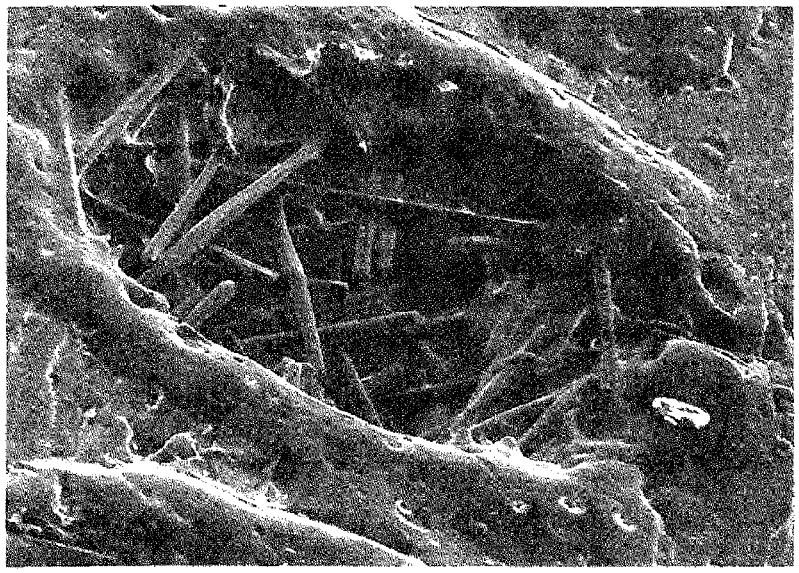
FIG. 1 is an electron micrograph showing the laser processed surface of a sliding member (test sample 1)

Embodiments of the present invention will be described below.

The polyamide resin used in the present invention is a polymer having a (—CO—NH—) bond. Examples of such polymers include polyhexamethylene adipamide (nylon 66), polycapramide (nylon 6), polytetramethylene adipamide (nylon 46), polyhexamethylene sebacamide (nylon 610), polyhexamethylene dodecamide (nylon 612), polyundecamethylene adipamide (nylon 116), polyundecamide (nylon 11), polydodecamide (Nylon 12), polytrimethyl hexamethylene terephthalamide (nylon TMDT), polyhexamethylene isophthalamide (nylon 6I), polyhexamethylene terephthal/isophthalamide (nylon 6T/6I), polybis(4-aminocyclohexyl)methane dodecamide (nylon PACM12), polybis(3-methyl-4-aminocyclohexyl)methane dodecamide (nylon dimethyl PACM12), polymetaxylylene adipamide (nylon MXD6), polynonamethylene terephthalamide (nylon 9T), polyundecamethylene terephthalamide (nylon 11T), polyundecamethylene hexahydroterephthalamide [nylon 11T(H)], and copolymerized polyamides or mixed polyamides thereof. Among the above, nylon 66 is preferred.

Polyamide resins are commercially available, such as, for example, "nylon 66" manufactured by Toray Industries, Inc.

The fibrous filler added to the polyamide resin is selected from carbon fibers, aramid fibers, and whiskers, which may be used alone or in combination.

The carbon fiber used in the present invention preferably has a diameter of 5 to 20 μm, and a length of 20 to 500 μm.

The raw material of the carbon fiber may be any of a PAN (polyacrylonitrile)-based, pitch-based, and like materials, but a carbon fiber obtained by calcining at 1,200° C. or lower is preferably used, in order to attain an enhanced reinforcing effect in the orientation direction in the polyamide resin.

The amount of the carbon fiber used is 10 to 50 wt %, preferably 12 to 35 wt %, and more preferably 14 to 30 wt %, based on the polyamide resin.

If the amount of the carbon fiber is less than 10 wt %, the reinforcing effect will be poor, resulting in an insufficient strength of the sliding member. Conversely, if the amount of the carbon fiber is more than 50 wt %, the resulting sliding member will be brittle and easily broken.

The aramid fiber preferably has a diameter of 5 to 20 μm, and a length of 20 to 500 μm.

The amount of the aramid fiber used is 10 to 50 wt %, preferably 12 to 35 wt %, and more preferably 14 to 30 wt %, based on the polyamide resin.

If the amount of the aramid fiber is less than 10 wt %, the reinforcing effect cannot be obtained; conversely, if the amount is more than 50 wt %, the resulting sliding member will be brittle and easily broken.

The whisker preferably has a diameter of 0.1 to 1 μm, and a length of 5 to 30 μm.

The amount of the whisker used is 10 to 50 wt %, preferably 12 to 35 wt %, and more preferably 14 to 30 wt %, based on the polyamide resin.

If the amount of the whisker is less than 10 wt %, the reinforcing effect cannot be obtained; conversely, if the amount is more than 50 wt %, the resulting sliding member will be brittle and easily broken.

The whisker used in the present invention is a complete single crystal that has grown in the form of an extremely fine whisker, has very few lattice defects, and has a strength approaching the theoretical value. Moreover, a whisker that is not merely a single crystal, but also has only one screw dislocation in the lengthwise direction, can also be used in the present invention.

Examples of whiskers for use in the present invention include aluminum borate whisker, zinc oxide whisker, and potassium titanate whisker. Potassium titanate whisker is preferred.

Potassium titanate whisker is a special material whose crystal is originally in a fibrous form. Therefore, the use of potassium titanate whisker in the present invention provides the effect of improving the dimensional stability and reinforcement.

The use of a fibrous filler results in a sliding member having excellent wear resistance, dimensional stability, and strength; moreover, in the present invention, the use of, in particular, a fibrous filler of the present invention results in a sliding member having both excellent frictional and wear properties.

In the present invention, one or a combination of inorganic fillers selected from talc, calcium carbonate, and clay may be used for adding to the polyamide resin.

Talc preferably has a mean particle size of 0.5 to 10 μm, and preferably 2 to 5 μm. The mean particle size is measured by a method of particle size distribution measurement.

The amount of the inorganic filler used is 10 to 50 wt %, and preferably 20 to 40 wt %, based on the polyamide resin.

If the amount of the inorganic filler is less than 10 wt %, the reinforcing effect cannot be obtained; conversely, if the amount is more than 50 wt %, the resulting sliding member will be brittle and easily broken.

The sliding member of the present invention is produced as follows: A polyamide resin is mixed with the above-defined amount of a fibrous filler or an inorganic filler. The mixture is molded into a predetermined shape, such as a seal ring, using a molding means such as an injection molding machine. Fine dents are subsequently formed in the surface of the molded article by dimpling using laser irradiation. In this manner, a sliding member having fine dents formed in its sliding surface is obtained.

The fine dents preferably have a maximum depth of 5 to 50 μm, in order to reduce friction.

When the depth of the fine dents is within this range, a favorable oil film can be maintained between the sliding surface of the sliding member of the present invention and the mating sliding surface, such as the inner surface of a cylinder, thereby preventing damage to the mating member.

Examples of laser media used for the laser irradiation include infrared lasers such as $CO_2$ and YAG, and UV lasers such as ArF, KrF, and XeCl. The laser temperature is preferably about 1,000° C.

Previously, when a glass fiber was used, the laser heat caused the glass fiber (glass melting point: 700° C.) to form hard raised portions, causing damage to the mating sliding surface. However, when the materials of the present invention are used, no such raised portions are formed, thus eliminating damage to the mating sliding surface.

One example of a known dimpling method is a technique wherein a pattern of oil reservoirs (dimples) is formed by a hot press in a reciprocating PTFE seal ring for compressors (JP-B-3114874). However, this technique has a problem in that, when dimpling is performed using a mold, because dimpled dents are fine, the use of a resin material containing a rigid filler results in a degraded quality because of mold wear (the mold life is short).

Another example of a known dimpling method is a technique wherein dimples are formed in a bearing sliding member by shot peening (JP-A-2003-184883). However, this technique has a problem in that, when dimples are formed with shot, although raised portions and dents can be formed with shot alone, dents only cannot be formed with shot alone.

In order to form only dents with shot, masking is required between the shot and the article; however, masking has the problem of being too costly.

In the present invention, because a laser is used for dimpling, only dents having excellent wear resistance can be formed, and a sliding member with a stable quality can be obtained without degradation in quality due to, for example, mold wear.

Furthermore, according to the process of the present invention, only dents of oil reservoirs (dimples) having excellent wear resistance can be formed, and a sliding member with a stable quality can be obtained.

EXAMPLES

Effects of the present invention will be demonstrated below, referring to Examples.

Example 1

1. Production of Test Samples

<Production of Test Sample 1>

85 wt % of "nylon 66" (a polyamide resin) was mixed with 15 wt % of a carbon fiber (diameter: 10 μm, fiber length: 150 μm), and the mixture was formed into a sliding member for seal rings, using an injection molding machine (Toshiba IS80-EPN).

The resulting sliding member is denoted as "test sample 1".

<Production of Test Sample 2>

85 wt % of "nylon 66" (a polyamide resin) was mixed with 15 wt % of an aramid fiber (diameter: 10 μm, fiber length: 150 μm), and the mixture was formed into a sliding member for seal rings, using an injection molding machine (Toshiba IS80-EPN).

The resulting sliding member is denoted as "test sample 2".

<Production of Test Sample 3>

70 wt % of "nylon 66" (a polyamide resin) was mixed with 30 wt % of potassium titanate whisker (diameter: 0.5 μm, fiber length: 20 μm), and the mixture was formed into a sliding member for seal rings, using an injection molding machine (Toshiba IS80-EPN). The resulting sliding member is denoted as "test sample 3".

<Production of Test Sample 4>

60 wt % of "nylon 66" (a polyamide resin) was mixed with 40 wt % of talc (mean particle size: 5 μm), and the mixture was formed into a sliding member for seal rings, using an injection molding machine (Toshiba IS80-EPN). The resulting sliding member is denoted as "test sample 4".

<Production of Comparative Test Sample 1>

70 wt % of "nylon 66" (a polyamide resin), manufactured by Toray Industries, Inc., was mixed with 30 wt % of a glass fiber (diameter: 15 μm, fiber length: 150 μm), manufactured by Toray Industries, Inc., and the mixture was formed into a sliding member for seal rings, using an injection molding machine (Toshiba IS80-EPN). The resulting sliding member is denoted as "comparative test sample 1".

2. Evaluation

The thus-obtained test samples and comparative test sample were evaluated for their properties based on the following evaluating tests.

(1) Roughness Ry of a Mating Member after Evaluation of Damage Resistance to the Mating Member <Measurement Method>

The roughness Ry of a mating member was determined under the following conditions: load: 100 kgf, peripheral speed: 100 mm/s, time: 12 min., and mating member: S45C(Ry: 0.3 to 0.5). The results are shown in Table 1. Note that "Ry" represents the maximum depth of profile (JIS B0601: 1994).

(2) Evaluation of Damage Resistance to the Mating Member

<Evaluation Method>

The roughness of the mating member after the evaluation of damage resistance was measured using a surface roughness meter, and the difference between the roughnesses before and after the test was observed.

<Evaluation Criteria>

A: The roughness of the mating member was equal to that before the evaluation.

B: The roughness of the mating member was larger than that before the evaluation (Rz was 0.6 or more)

The evaluation results are shown in Table 1. Note that "Rz" represents the 10-point mean roughness (JIS B0601: 1994).

(3) Surface Conditions of the Sliding Member after Laser Processing

Figure 2:
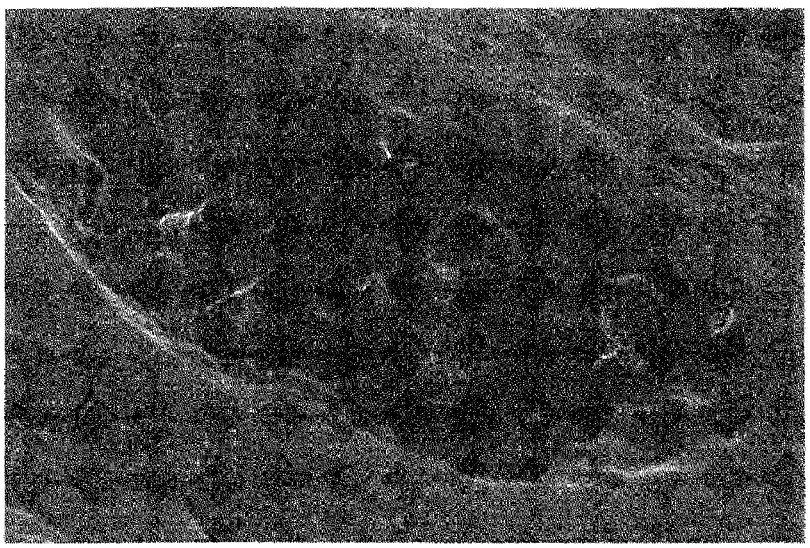
FIG. 2 is an electron micrograph showing the laser processed surface of a sliding member (test sample 2)
Figure 3:
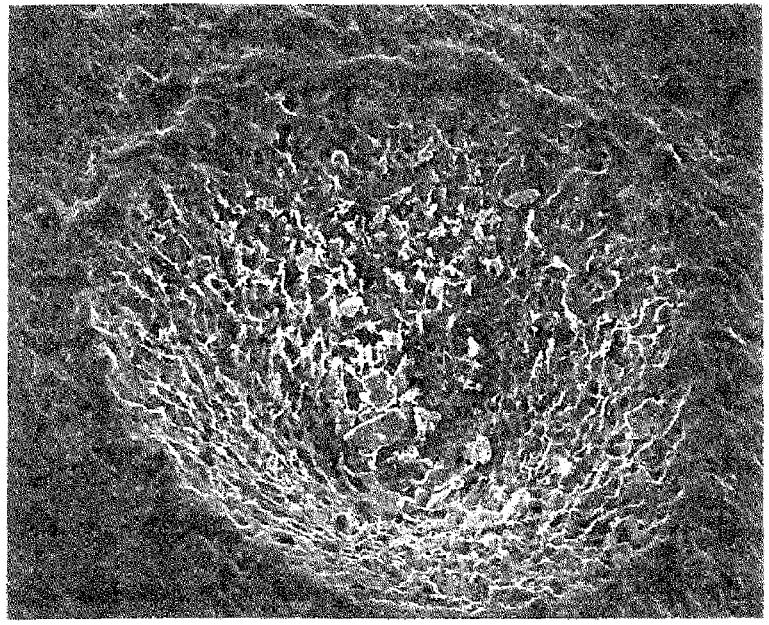
FIG. 3 is an electron micrograph showing the laser processed surface of a sliding member (test sample 3)
Figure 4:
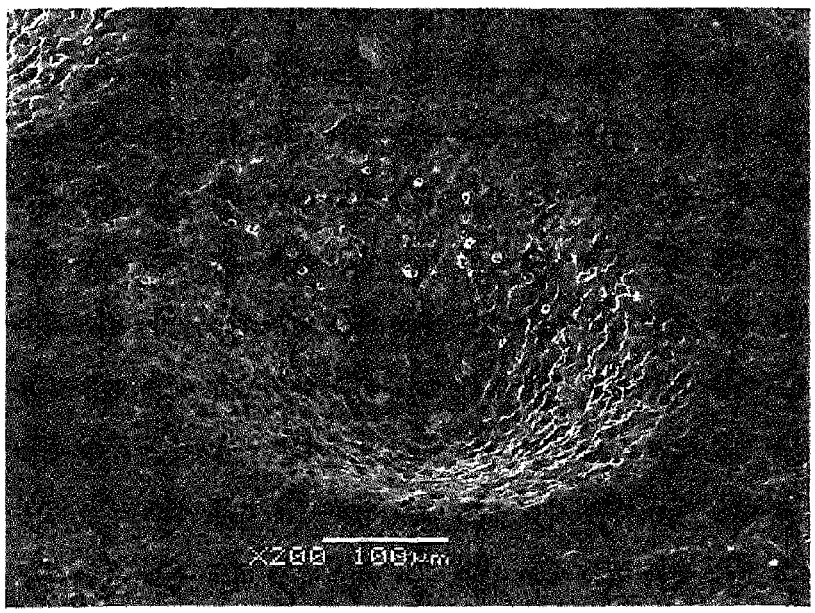
FIG. 4 is an electron micrograph showing the laser processed surface of a sliding member (test sample 4)
Figure 5:
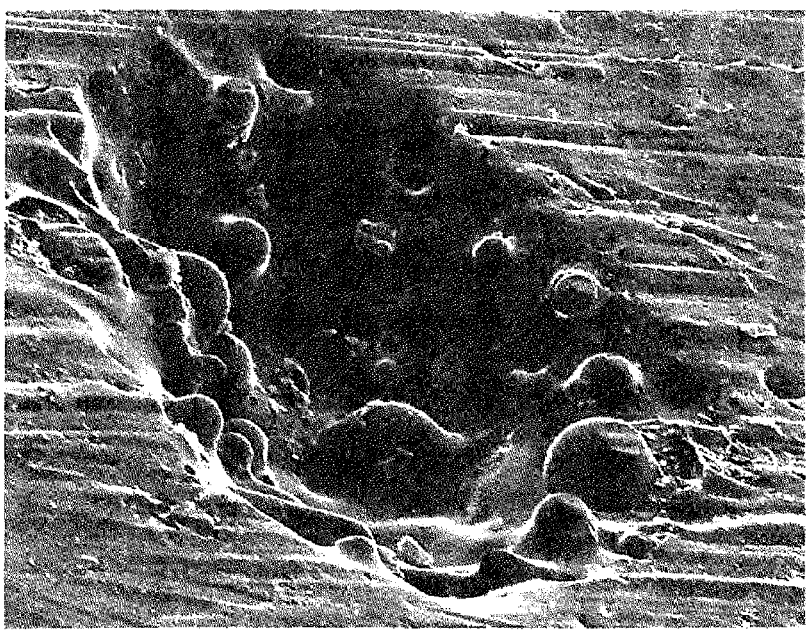
FIG. 5 is an electron micrograph showing the laser processed surface of a sliding member (comparative test sample 1).

The surface conditions of the sliding member were examined using electron micrographs. FIGS. 1 to 5 show the electron micrographs. The results revealed that the test samples 1 to 4 were free of any raised portions. The comparative test sample shown in FIG. 5 had glass spheres and projections generated by the melting of the glass fiber due to the laser heat.

$CO_2$ was used as the laser medium, and the laser temperature was 1,000° C.

(4) Frictional and Wear Properties

The friction coefficient [−] and wear coefficient [$10^{-5}$ cm·s/(MPa·m·h)] were determined under the following conditions: surface pressure: 0.5 MPa, peripheral speed: 0.2 m/s, time: 24 hr, and mating member: S45C (Rz: 1.5). The results are shown in Table 1.

(5) Qualitative Evaluation of Frictional and Wear Properties

<Evaluation Criteria>

A: Equal to or higher than the frictional and wear properties of the comparative member B: The wear coefficient is higher than that of the comparative member The evaluation results are shown in Table 1.

(6) Mechanical Properties

The flexural strength [MPa] and flexural modulus of elasticity [GPa] were determined according to ASTM D790. The results are shown in Table 1.

TABLE 1

|  | Test Sample 1 | Test Sample 2 | Test Sample 3 | Test Sample 4 | Comparative Test Sample 1 |
| --- | --- | --- | --- | --- | --- |
| Composition (Wt %) | | | | | |
| Nylon 66 | 85 | 85 | 70 | 60 | 70 |
| Glass Fiber |  |  |  |  | 30 |
| Carbon Fiber | 15 |  |  |  |  |
| Aramid Fiber |  | 15 |  |  |  |

TABLE 1-continued

|  | Test Sample 1 | Test Sample 2 | Test Sample 3 | Test Sample 4 | Comparative Test Sample 1 |
|---|---|---|---|---|---|
| Potassium Titanate Whisker |  |  | 30 |  |  |
| Talc |  |  |  | 40 |  |
| Roughness of Mating Member after Evaluation of Damage Resistance to the Mating Member | Ry 0.4 μm | Ry 0.5 μm | Ry 0.3 μm | Ry 0.4 μm | Ry 4.9 μm |
| Evaluation of Damage Resistance to the Mating Member | A | A | A | A | B |
| Frictional and Wear Properties | | | | | |
| Friction Coefficient [—] | 0.24 | 0.23 | 0.15 | 0.37 | 0.41 |
| Wear Coefficient [$10^{-5}$ cm · s/MPa · m · h] | 19 | 15 | 16 | 1415 | 152 |
| Qualitative Evaluation of Frictional and Wear Properties | A | A | A | B | A |
| Mechanical Properties | | | | | |
| Flexural Strength [MPa] | 234 | 111 | 204 | 163 | 185 |
| Flexural Modulus of Elasticity [GPa] | 9.2 | 3.8 | 8.3 | 5.9 | 6.2 |

It can be seen from Table 1 that the test samples 1 to 4 exhibit low friction coefficients. Moreover, with respect to the evaluation of damage resistance to the mating member, the test samples 1 to 4 exhibit mating member roughnesses that are equal to those before the evaluation, i.e., the mating member roughnesses after the evaluation of the damage resistance to the mating member are small.

Furthermore, with respect to the qualitative evaluation of frictional and wear properties, the test samples 1 to 3 exhibit frictional and wear properties equal or better than those of the comparative material and low wear coefficients, indicating that the test samples 1 to 3 possess both low frictional and low wear characteristics.

It can be seen that the comparative test sample 1, which do not use the raw materials of the present invention, has a poor result in the evaluation of damage resistance to the mating member, and exhibits a quite large mating member roughness after the evaluation of damage resistance to the mating member.

We claim:

1. A process for producing a sliding member comprising adding 10 to 50 wt % of a fibrous filler selected from the group consisting of carbon fibers, aramid fibers, and whiskers to a polyamide resin, then forming a sliding member into a predetermined shape, using a molding means, then forming fine dents having a maximum depth of 5 to 50 μm in a sliding surface of the sliding member by applying a dimpling process to the sliding member, using a laser, and forming no raised portions projecting from the same sliding surface as said sliding surface consisting of melted spheres and projections due to laser heat inside of the fine dents and around the dents at the time of the dimpling process.

* * * * *